(12) United States Patent
Shukla et al.

(10) Patent No.: US 8,490,052 B2
(45) Date of Patent: Jul. 16, 2013

(54) DECLARATIVE PROGRAMMING MODEL FOR AUTHORING AND EXECUTION CONTROL AND DATA FLOW FOR RESOURCE ORIENTED SYSTEM

(75) Inventors: Dharma Shukla, Sammamish, WA (US); Aditya Bhandarkar, Redmond, WA (US); Ori Amiga, Seattle, WA (US); Raymond Endres, Redmond, WA (US); Abhay Parasnis, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1067 days.

(21) Appl. No.: 12/250,600

(22) Filed: Oct. 14, 2008

(65) Prior Publication Data
US 2010/0095272 A1    Apr. 15, 2010

(51) Int. Cl.
*G06F 9/44*    (2006.01)
(52) U.S. Cl.
USPC .......................................................... 717/117
(58) Field of Classification Search
USPC .......................................................... 717/117
See application file for complete search history.

(56) References Cited

U.S. PATENT DOCUMENTS

| | | | |
|---|---|---|---|
| 5,369,570 A | 11/1994 | Parad | |
| 5,564,044 A | 10/1996 | Pratt | |
| 5,640,572 A | 6/1997 | Mondrik et al. | |
| 5,826,239 A | 10/1998 | Du et al. | |
| 5,862,379 A | 1/1999 | Rubin et al. | |
| 5,983,265 A | 11/1999 | Martino, II | |
| 5,991,802 A | 11/1999 | Allard et al. | |
| 6,064,813 A | 5/2000 | Sitbon et al. | |
| 6,134,559 A | 10/2000 | Brumme et al. | |
| 6,178,546 B1 | 1/2001 | McIntyre | |
| 6,560,777 B2 | 5/2003 | Blackketter et al. | |
| 6,654,950 B1 | 11/2003 | Barnishan | |
| 6,668,354 B1 | 12/2003 | Chen et al. | |
| 6,775,658 B1 | 8/2004 | Zothner | |
| 7,035,943 B2 | 4/2006 | Yamane et al. | |
| 7,171,650 B2 * | 1/2007 | Fenton et al. | 717/120 |
| 7,194,473 B1 | 3/2007 | Hichwa et al. | |
| 7,237,034 B2 * | 6/2007 | Clarke et al. | 709/235 |
| 7,289,964 B1 | 10/2007 | Bowman-Amuah | |

(Continued)

OTHER PUBLICATIONS

Martin Brown, "Build Perl applications with Eclipse", internet article, Jan. 17, 2006.*

(Continued)

*Primary Examiner* — Don Wong
*Assistant Examiner* — Daxin Wu
(74) *Attorney, Agent, or Firm* — Microsoft Corporation (57) ABSTRACT

A data set may be managed by a host that provides access to clients through a protocol, such as a RESTful HTTP interface. A resource script may be expressed according to a script language featuring two types of instructions: data set instructions that correspond to the verbs of the protocol, and flow control instructions that alter the flow of execution of the resource script. At runtime, an execution context for the resource script may be selected as a local execution context (through a local script processor that issues protocol verbs to the host based on the data set operations) or a remote execution context (by sending the resource script to a script processor located on the host.) The runtime selection of data context may be executed without having to reconfigure the resource script, and with an equivalent effect on the data set.

20 Claims, 6 Drawing Sheets

U.S. PATENT DOCUMENTS

| | | | |
|---|---|---|---|
| 7,392,509 B2 | 6/2008 | Sinha et al. | |
| 7,441,188 B1* | 10/2008 | Russell et al. | 715/273 |
| 7,555,757 B2* | 6/2009 | Smith et al. | 719/328 |
| 7,581,212 B2 | 8/2009 | West et al. | |
| 7,607,124 B2 | 10/2009 | Gooty et al. | |
| 7,631,291 B2* | 12/2009 | Shukla et al. | 717/107 |
| 7,721,259 B2* | 5/2010 | Heinke et al. | 717/121 |
| 7,801,896 B2* | 9/2010 | Szabo | 707/739 |
| 7,831,964 B2* | 11/2010 | Nagashima et al. | 717/137 |
| 7,840,647 B2* | 11/2010 | Kloba et al. | 709/217 |
| 7,870,498 B2 | 1/2011 | Drummond et al. | |
| 8,280,925 B2* | 10/2012 | Arthursson et al. | 707/810 |
| 2003/0110096 A1 | 6/2003 | Dathi | |
| 2003/0163567 A1 | 8/2003 | McMorris et al. | |
| 2003/0167317 A1 | 9/2003 | Deen et al. | |
| 2003/0182463 A1* | 9/2003 | Valk | 709/310 |
| 2004/0027379 A1 | 2/2004 | Hong Huey et al. | |
| 2004/0133876 A1 | 7/2004 | Sproule | |
| 2004/0187080 A1 | 9/2004 | Brooke et al. | |
| 2004/0255046 A1* | 12/2004 | Ringseth et al. | 709/246 |
| 2004/0258089 A1 | 12/2004 | Derechin et al. | |
| 2005/0044526 A1 | 2/2005 | Kooy | |
| 2005/0060685 A1 | 3/2005 | Franz et al. | |
| 2005/0097503 A1* | 5/2005 | Zintel et al. | 717/100 |
| 2005/0114779 A1 | 5/2005 | Griesmer | |
| 2005/0120347 A1 | 6/2005 | Asare et al. | |
| 2005/0138137 A1* | 6/2005 | Encarnacion et al. | 709/217 |
| 2005/0177820 A1 | 8/2005 | Mei et al. | |
| 2006/0070086 A1 | 3/2006 | Wang | |
| 2006/0074734 A1 | 4/2006 | Shukla et al. | |
| 2006/0117073 A1 | 6/2006 | Bosworth et al. | |
| 2006/0150145 A1 | 7/2006 | Khandekar | |
| 2006/0230124 A1* | 10/2006 | Belfiore et al. | 709/219 |
| 2006/0288332 A1 | 12/2006 | Sarar et al. | |
| 2007/0011672 A1* | 1/2007 | Bhide et al. | 717/174 |
| 2007/0050512 A1* | 3/2007 | Chintalapati et al. | 709/230 |
| 2007/0106649 A1* | 5/2007 | Moore | 707/3 |
| 2007/0162899 A1 | 7/2007 | Schmidt et al. | |
| 2007/0226024 A1 | 9/2007 | Harvey et al. | |
| 2007/0226259 A1 | 9/2007 | Kacin et al. | |
| 2007/0239499 A1 | 10/2007 | Shukla et al. | |
| 2007/0256055 A1 | 11/2007 | Herscu | |
| 2007/0276692 A1 | 11/2007 | Mei et al. | |
| 2008/0155330 A1 | 6/2008 | Van Wyk et al. | |
| 2008/0201338 A1* | 8/2008 | Castro et al. | 707/100 |
| 2009/0106739 A1 | 4/2009 | Weatherbee et al. | |
| 2009/0187573 A1* | 7/2009 | Johnston et al. | 707/10 |
| 2009/0249695 A1* | 10/2009 | Jain | 49/148 |
| 2009/0254881 A1 | 10/2009 | Johnson et al. | |
| 2009/0292766 A1* | 11/2009 | Morris | 709/203 |

OTHER PUBLICATIONS

Timothy M. Chester, "Cross-Platform Integration with XML and SOAP", 2001 IEEE.*
Wikipedia article "Common Gateway Interface", Feb. 20, 2006.*
Mastering Perl for Bioinformatics, James D. Tisdall—2003—O'Leilly.*
U.S. Appl. No. 12/250,637, filed Oct. 14, 2008, Shukla et al.
U.S. Appl. No. 12/253,545, filed Oct. 17, 2008, Shukla et al.
"API Test Console", Retrieved at <<http://www.google.com/base/api/demo/html/demo.html>>, Oct. 1, 2008, pp. 1-3.
"Enforcing Business Rules with Triggers", Retrieved at <<http://msdn.microsoft.com/en-us/library/aa214450(SQL.80).aspx>>, Jun. 25, 2008, p. 1.
"Interactive Development Environment (IDE) Enhancements", Retrieved at <<http://msdn.microsoft.com/en-us/library/aa976855(VS.71).aspx>> Oct. 1, 2008.
"Live Search Interactive SDK", Retrieved at <<http://dev.live.com/livesearch/sdk/>>, Oct. 1, 2008, p. 1.
Massoni, Joe, "An Inside Look at Developing Applications using the New Features of Visual C++6.0", Retrieved at <<http://www.microsoft.com/msj/1098/vc6newfeatures/vc6newfeatures.aspx>>, Oct. 1998, Sep. 30, 2008, pp. 1-11.
Mazzetti, et al., "RESTful Implementation of Geospatial Services", Retrieved at <<http://www.cosis.net/abstracts/EGU2008/05160/EGU2008-A-05160-1.pdf?PHPSESSID=>>, Geophysical Research Abstracts, vol. 10, EGU2008-A-05160, 2008, EGU General Assembly 2008.
"Microsoft Dynamics AX Debugger", Retrieved at <<http://msdn.microsoft.com/en-us/library/aa569669(AX.10).aspx>>, Oct. 1, 2008, p. 1.
"Pipes", Retrieved at <<http://pipes.yahoo.com/pipes/pipes.popular>>, Oct. 1, 2008, pp. 1-6.
"Play with the APIs", Retrieved at<<http://blog.programmableweb.com/2007/03/26/9-places-to-use-apis-without-coding/>>, Oct. 1, 2008, pp. 1-7.
"PopFly Designer", Retrieved at <<http://www.popfly.com/Home.aspx>>, Oct. 1, 2008, pp. 1-3.
"Resource Builder 2.3.3", Retrieved at <<http://www.bluechillies.com/details/16235.html>>, Sep. 30, 2008, pp. 1-2.
Szepielak, Daniel, "REST-Based Service Oriented Architecture for Dynamically Integrated Information Systems", Retrieved at <<http://infolab.uvt.nl/phd-icsoc07/files/phdicsoc06szepielak.pdf>>, pp. 7-12.
"Tablet PC Add Support for Digital Ink to Your Windows Applications", Retrieved at <<http://msdn.microsoft.com/en-us/magazine/cc163869.aspx>>, Sep. 30, 2008, pp. 1-11.
Valley, Scotts , "CodeGear™ Accelerates Web Development with New Version of its Visual Development Environment for PHP", Retrieved at <<http://www.codegear.com/article/37885>>, California , Apr. 14, 2008, p. 1.
"Virtual Earth Interactive SDK ", Retrieved at <<http://dev.live.com/virtualearth/sdk/>>, Oct. 1, 2008, p. 1.
"Windows Live Dev", Retrieved at <<http://dev.live.com/livedata/sdk/>>, Oct. 1, 2008, p. 1.
"Windows Workflow Foundation Designer" Retrieved at <<http://msdn.microsoft.com/en-us/library/ms441543.aspx>>, Oct. 1, 2008, pp. 1-2.
"Yahoo-Pipes", Retrieved at <<http://pipes.yahoo.com/pipes>>, Oct. 1, 2008, p. 1.
International Search Report cited in related PCT Application No. PCY/US2009/061024 dated Jun. 7, 2010.
Needleman, Rafe, "SugarSync: Most Useful Sync Tool Ever. But You'll Pay for it.", retrieved at <<http://www.webware.com/8301-1_109-9895297-2.html>>, Mar. 19, 2008, pp. 2.
"BeInSync Professional", retrieved at <<http://www.beinsync.com/products/professional/>>, pp. 2.
"DropBox", retrieved at <<http://www.getdropbox.com/>>, Jun. 26, 2008, pp. 3.
Redmond, Wash. "Microsoft Acquires FolderShare, a File-Synchronization Technology Provider", retrieved at <<http://www.microsoft.com/presspass/press/2005/nov05/11-03FolderSharePR.mspx>>, Nov. 3, 2005 pp. 2.
Catone, Josh, "Live Mesh: First Look at Microsoft's New Platform", retrieved at <<http://www.readwriteweb.com/archives/microsoft_live_mesh_first_look.php>>, Apr. 22, 2008, pp. 4.
"Batch Processing with Google Data APIs", retrieved at <<http://code.google.com/apis/gdata/batch.html>>, Jun. 25, 2008, pp. 17.
"Proposal for an OpenSocial RESTful API (DRAFT)", retrieved at <<http://docs.google.com/View?docid=dfjqf7vg_3cwzpkw2z>>, pp. 7.
"Batch!" retrieved at <<http://www.snellspace.com/wp/?p=788>>, Jun. 25, 2008, pp. 6.
"Son of a Batch!", retrieved at <<http://www.snellspace.com/wp/?p=885>>, Jun. 25, 2008, pp. 2.
Non-Final Office Action cited in U.S. Appl. No. 12/250,637 dated Feb. 25, 2011, 30 pgs.
Reply to Non-Final Office Action cited in U.S. Appl. No. 12/250,637 dated Apr. 29, 2011, 21 pgs.
Final Office Action cited in U.S. Appl. No. 12/250,637 dated Jul. 8, 2011, 22 pgs.
Reply to Final Office Action cited in U.S. Appl. No. 12/250,637 dated Oct. 11, 2011, 20 pgs.
Non-Final Office Action cited in U.S. Appl. No. 12/250,637 dated Nov. 18, 2011, 11 pgs.
Reply to Non-Final Office Action cited in U.S. Appl. No. 12/250,637 dated Feb. 19, 2012, 19 pgs.

Final Office Action cited in U.S. Appl. No. 12/250,637 dated Apr. 6, 2012, 11 pgs.
Reply to Final Office Action cited in U.S. Appl. No. 12/250,637 dated Jul. 6, 2012, 18 pgs.
Notice of Allowance cited in U.S. Appl. No. 12/250,637 dated Aug. 17, 2012, 12 pgs.
RCE Transmittal cited in U.S. Appl. No. 12/250,637 dated Nov. 19, 2012, 3 pgs.
Non-Final Office Action cited in U.S. Appl. No. 12/253,545 dated Aug. 15, 2012, 27 pgs.
Reply to Non-Final Office Action cited in U.S. Appl. No. 12/253,545 dated Dec. 17, 2012, 22 pgs.
Int. Preliminary Report on Patentability cited in PCT Application No. PCT/US2009/061024 dated Apr. 19, 2011, 4 pgs.

* cited by examiner

```
100 ─┐
    ┌─────────────────────────────────────────────────────────────────────────┐
    │ <Sequence>                                                              │
    │   <Statement name="Operation1" type="Post" param1="Objects/object1">    │
    │     <Content>Object 1 Content</Content>                                 │
102 │   </Statement>                                                          │
  ──┤──<Statement name="ConditionalOperation" type="If">                      │
104 │     <Conditional>Statement1.Result == false</Conditional>               │
  ──┤─── <Statement name="GotoOperation" type="Goto" param1="Operation1" />   │
106 │   </Statement>                                                          │
  ──┤──<Statement name="LoopOperation" type="Repeat" param1="2">              │
    │     <Statement name="Operation2" type="Post" param1="Objects/object2">  │
    │       <Content>Object 2 Content</Content>                               │
    │     </Statement>                                                        │
    │     <Statement name="Operation3" type="Get" param1="Objects/object2">   │
108 │   </Statement>                                                          │
  ──┤──<Statement name="ConcurrentOperation" type="Concurrent">               │
    │     <Statement name="Operation4" type="Post" param1="Objects/object3">  │
    │       <Content>Object 3 Content</Content>                               │
110 │     </Statement>                                                        │
  ──┤──<Statement name="Operation5" type="Post" param1="Objects/object4">     │
    │       <Content>Object 4 Content</Content>                               │
    │     </Statement>                                                        │
    │   </Statement>                                                          │
    │   <Statement name="OperationAsynchronous" type="AsynchronousBegin" param1="Object5PutHandler"> │
    │     <Statement name="Operation6" type="Post" param1="Objects/object5">  │
    │       <Content>Object 5 Content</Content>                               │
    │     </Statement>                                                        │
    │   </Statement>                                                          │
    │ </Sequence>                                                             │
    └─────────────────────────────────────────────────────────────────────────┘
```

DECLARATIVE PROGRAMMING MODEL FOR AUTHORING AND EXECUTION CONTROL AND DATA FLOW FOR RESOURCE ORIENTED SYSTEM

BACKGROUND

Many computing scenarios involve a data set (such as a file system, a database, an object set, etc.) that managed by a host, and that is to be updated based on a set of operations, such as creating one or more items in the data set, reading one or more items in the data set, updating one or more items in the data set, and/or deleting one or more items in the data set (together comprising a standard set of "CRUD" operations.) Moreover, the host may be accessible through a particular protocol, such as HTTP, and the operations may correspond to a set of verbs permitted in the protocol (e.g., HTTP POST, HTTP GET, HTTP PUT, and HTTP DELETE.) An operations set may involve a series of such operations configured in a sequence to achieve a particular result (e.g., bidirectionally synchronizing a portion of a filesystem on a remote server with a locally stored version of the same portion of the filesystem.) This operations set may be performed on a device other than the host, e.g., by issuing a first operation to the host, and upon receiving notice of completion of the operation issuing a second operation, etc. The operations set may also be performed on the device as part of an application, e.g., a data-driven application that exchanges data with the host as the source of the data featured in the application.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

The execution of operations in an operations set upon a data set managed by a host may be achieved in many ways, but some complications may arise due to the nature of the interaction. A sequential issuing and executing of operations may be very inefficient, because each operation involves a network transport cost, and some operations may be concurrently executable. An asynchronous issuing and executing of operations may alleviate some of the inefficiency, but may be more complicated to design and debug (e.g., the source code may specify an asynchronous issuing of an operation, but may specify the receiving of an operation result or notification of completion elsewhere in an event handler function, thereby interrupting the logical flow and readability of the source code.) A batch of operations may be sent together to be concurrently or sequentially executed, but an unavailability of flow control in batch programming may limit the scope of tasks that may be achieved. Finally, a mobile agent may be compiled and delivered to the host, but the mobile agent may have to be compiled in view of the architecture of the host (e.g., targeted to a particular instruction set and/or hardware architecture) and may raise security risks for the host.

An alternative technique for performing an operations set against the data set managed by the host involves the use of a script language that includes data set instructions corresponding to the verbs of the protocol, as well as flow-control instructions that specify an altering of the execution flow of operations. A resource script expressed according to this script language may be executed by a script processor that can interpret the operations of the resource script to apply the corresponding protocol verbs to the data set and to alter the execution flow of the resource script based on the flow control operations. Moreover, the resource script may be expressed at design time, and when the resource script is selected (promptly or at a later date) for execution, an execution context may then be selected, such as local execution (e.g., by issuing corresponding verbs of the protocol to the host) or remote execution (e.g., by delivering the script to the host.) The execution context may therefore be selected at runtime without compromising the logical flow of operations specified therein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Many computing scenarios involve a data set managed by a host, such as a filesystem hosted by a filesystem host, a database hosted by a database server, and an object set hosted by an object server. The data set may be exposed to various clients, such as devices and users, which may perform various operations on the data set. Many such scenarios include a basic set of operations for manipulating the data set, such as create, read, update, and delete operations (together referred to as a "CRUD" model for manipulating data sets.) Moreover, these operations are often combined in a particular configuration to achieve a particular task, such as synchronizing a remote filesystem on a server with a local version of the filesystem or inserting records into a database in a transactional manner.

The computing host may be configured to receive requests for performing such operations if specified according to a particular protocol. For example, the host may be configured as an HTTP endpoint (such as a webserver), and may permit interaction with the data set through a standard set of HTTP verbs. The hypertext transfer protocol was originally devised for communicating with a webserver (e.g., to request a page or resource stored on the webserver via HTTP GET) and a set of applications provided therein (such as HTTP gateway scripts, which could be accessed with parameters via HTTP POST), many servers translate HTTP requests to particular instructions for manipulating a data set (e.g., HTTP POST corresponding to a read instruction; HTTP GET corresponding to a create instruction; HTTP PUT corresponding to an update instruction; and HTTP DELETE corresponding to a delete instruction.) This configuration, sometimes referred to as a representational state transfer ("RESTful") use of a protocol, permits the server to extend access to the data set to a wide range of applications over a widely supported protocol.

While the simple design of HTTP and other protocols promotes the adoption of such protocols, the simplicity may limit the scope of computing operations that may be performed. As a first example, HTTP and many other protocols are stateless, such that a first request may be unable to alter the operating environment in a manner that is detectable by a second request (without actually altering the data set.) As a second example, HTTP and many other protocols offer limited or no support for executing multiple operations in a particular configuration. For example, a webserver may receive several requests in a particular order, but may validly choose to evaluate and perform such requests in an arbitrary order. While such asynchrony may be beneficial for serving webpages (which are composed on-the-fly based on the receipt of constituent elements, and which often produce the same resulting webpage regardless of the order of receipt), it may be unacceptable for sequences of logical operations.

Figure 1:
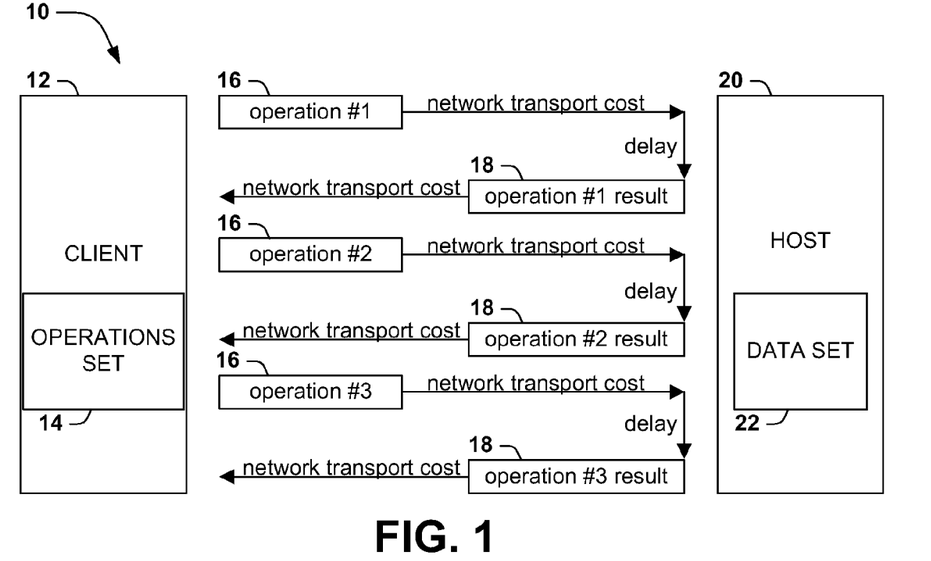
FIG. 1 illustrates an exemplary scenario featuring a technique for executing an operations set against a data set through a protocol in a synchronous manner.

The task of executing operations on the host in a particular order or manner may be partially or wholly delegated to a user or device. FIG. 1 illustrates a first scenario 10 involving a client 12 that wishes to perform an operations set 14 on a data set 22 managed by a host 20. The client 12 may therefore send the operations 16 of the operations set 14 in sequence, such that a first operation 16 is issued to the host 20 and a response 18 (such as an acknowledgment of having performed the operation, or a result data set) is received from the host 20 before a second operation 16 is issued. The client 12 may therefore configure the execution of the operations 16 of the operations set 14 in a manner that achieves a particular logical sequence. However, such designs may be problematic in many aspects. As a first example, the issuing of each operation 16 typically involves establishing a connection with the host 20 over a network, sending the operation 16 over the network, awaiting a result 16, receiving the result 16 from the host 20, and shutting down the connection, that together comprise a network transport cost of the operation 16. If many operations 16 are to be performed in sequence, the network transport costs may arise from each operation 16, increasing the computational and network costs and reducing the performance of the operations set 14 (such as the duration of execution.)

Figure 2:
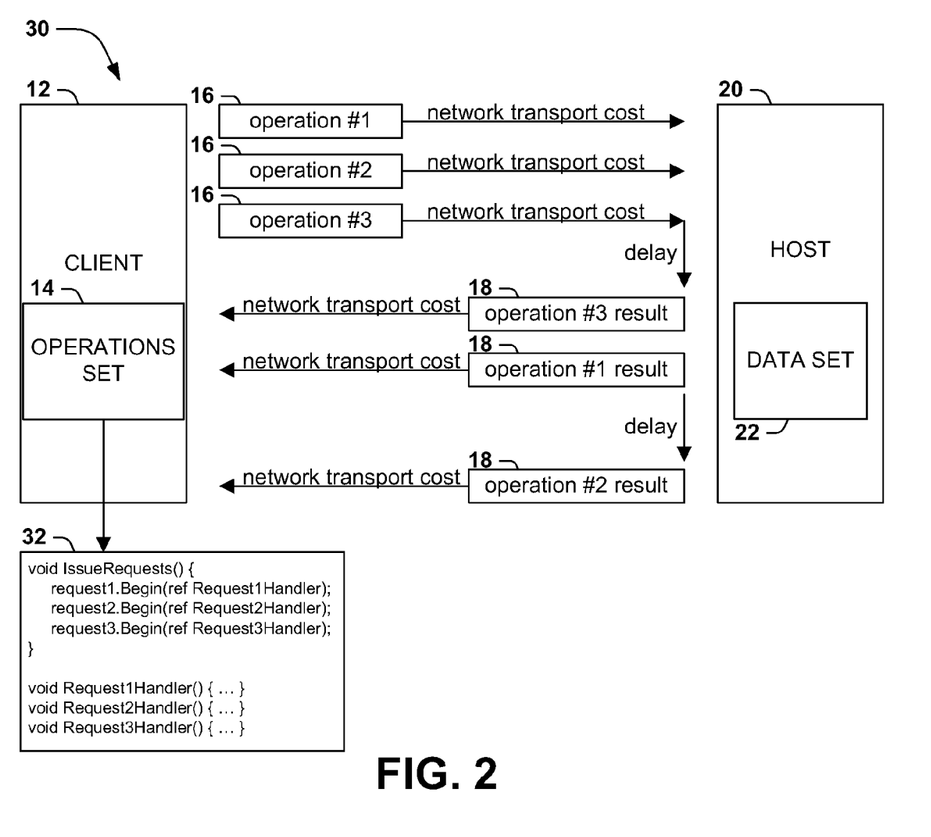
FIG. 2 illustrates an exemplary scenario featuring a technique for executing an operations set against a data set through a protocol in an asynchronous manner.

FIG. 2 illustrates a second scenario 30 wherein the performance costs of sequentially issuing operations 16 to the host 20 are at least partially alleviated by asynchronously issuing requests 16 (such as by issuing an operation as a nonblocking request, and by handling the completion of the request in a callback function.) The manner of executing the operations set 14 may therefore be organized such that operations 16 that are logically sequential may be sequentially issued, while operations 16 that are not logically sequential (i.e., that may be performed concurrently) may be asynchronously issued to the host 20. However, the configuration of such operations 16 in a client application may be complicated due to the asynchronous nature of the interaction. As illustrated in the exemplary pseudocode block 32 for the operations set 14 of FIG. 2, the request 16 may be issued in a particular location in the source code, but the result 18 may be handled in a completely different location (or even a different module.) Thus, the issuing of the request 16 and the handling of the result 18 are lexically uncoupled in the source code. This uncoupling may unduly increase the complexity of designing the application, of debugging or profiling the application, and of developing an understanding of the logical flow of the source code and the semantics of the interaction.

Figure 3:
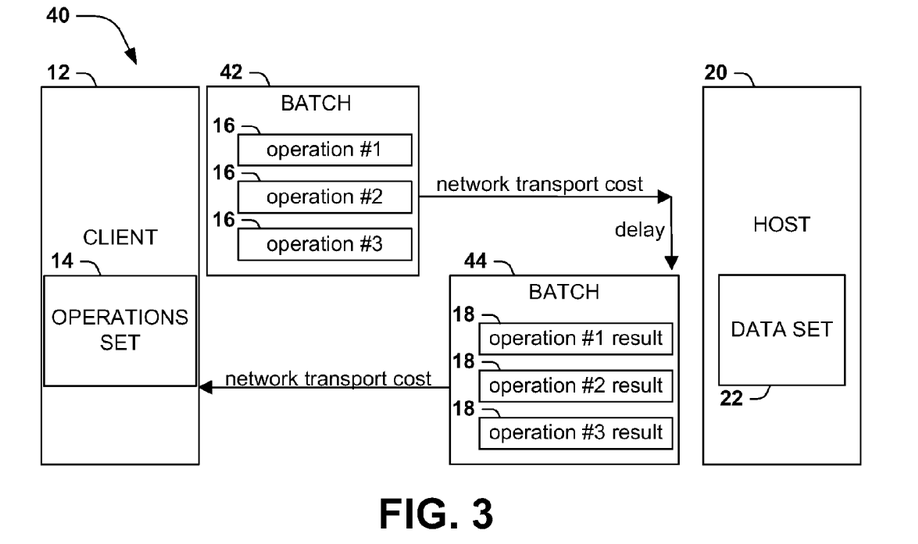
FIG. 3 illustrates an exemplary scenario featuring a technique for executing an operations set against a data set involving a batching of operations.

FIG. 3 illustrates a third scenario 40 involving an executing of the operations set 14 on the data set 22 that utilizes batching of operations 16. The client 12 may express the operations set 14 as an operation batch 42 comprising operations 16 that may be executed by the host 20, and the results 18 may be gathered in an operation result batch 42 and returned to the client 12. The operation batch 42 is simply an aggregation of operations 16 that might be individually issued and handled, and the batching is simply a packaging of the operations 16 for delivery in a single network connection between the client 12 and the host 20. While batching may reduce the inefficiencies of network transport costs of individual issuing that are illustrated in FIG. 1, the host 20 may still choose to evaluate the operations 16 in any arbitrary order. Alternatively, the host 20 may choose to evaluate the operations 16 in a specified order, but the operation batch 42 may not have any capacity for altering the flow of execution except a logical sequence. Moreover, the host 20 still processes the operations 16 in a stateless and isolated manner, such that the evaluation of one operation 16 may not affect or preclude the evaluation of another operation 16. While batching may reduce inefficient network usage, it may exclude many types of tasks from the range that may be so accomplished.

Figure 4:
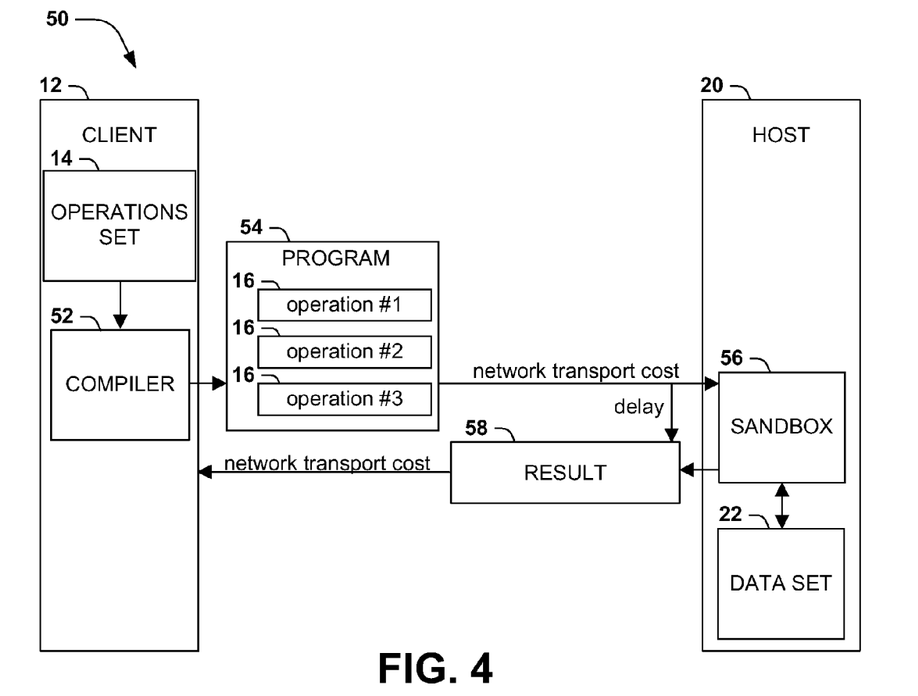
FIG. 4 illustrates an exemplary scenario featuring a technique for executing an operations set against a data set involving a mobile agent.

FIG. 4 illustrates a fourth scenario 50 involving an executing of the operations set 14 on the data set 22 that promotes a more sophisticated expression of the operations set 14 that may expand the range of tasks achievable thereby through the use of mobile agent techniques. The client 12 may choose to express the operations set 14 as a program 54, wherein the operations 16 may be compiled by a compiler 52 into a set of partially or wholly compiled machine-executable operations. The host 20 may receive the program 54, locally execute it against the data set 22, and may return a result 58 of the program 54 to the client 12. (Alternatively, the client 12 may express the operations set 14 as compilable source code, which the host 20 may compile into machine-executable operations.) The use of mobile agent techniques may expand the flow control of the execution of the operations set 14 and provide a stateful aspect, such that operations 16 may affect the processing of other operations 16, and may therefore improve the range of tasks that may be executed on the data set 22. However, many problems may arise from this manner of expressing and executing the operations set 14. First, mobile agent techniques often raise security concerns due to the execution of arbitrary code against the host 20, which may be malicious, faulty, and/or inefficient. The host 20 may therefore have to apply one or several security techniques, such as executing the program 54 representing the operations set 14 within a sandbox 56 that inspects the operations and safeguards against misuse, and such security techniques may increase the computational costs to the host 20. Second, the client 12 may have to prepare the program 54 in view of the capabilities of the host 20, such as the hardware architecture, supported instruction sets, and the availability of software libraries. This host-specific expression increases the complexity in developing, debugging, and understanding the operations set 14, and may limit the robustness of the operations set 14 (e.g., the program 54 might not be amenable to evaluation or execution on the client 12 or on a different host 20), and may not be able to access the data set 22 according to the protocols supported by the host 20 (such as HTTP), thereby reducing the benefits yielded from protocol-based accessing techniques.

In view of these techniques and the advantages, difficulties, and inefficiencies arising therefrom, an alternative technique may be devised for performing an operations set on a data set accessible through a host according to a protocol. The alternative technique involves a scripting language featuring two types of instructions: data set instructions corresponding to the verbs of the protocol, and flow control instructions. Data set operations (those that specify data set instructions) may be processed by the host according to the corresponding verbs of the protocol (e.g., an operation comprising a read instruction may be processed by the host as an HTTP GET operation), whereas flow control operations (those that specify flow control instructions) may be evaluated and may alter the execution flow of the resource script (e.g., by repeating the performing of particular operations, by conditioning the performing of particular instructions on a predicate, and/or by jumping relocating the flow of execution to a target operation.) By expressing an operations set in a resource script having at least one data set operation and at least one flow control operation, the client may permit the host to evaluate the resource script in a comparatively lightweight script processor that processes operations pertaining to the data set according to the protocol (e.g., by passing the operations through to the components of the host that handle requests through the protocol, such as a webserver), while the flow-control instructions may be handled by the script processor. The script language may also permit instructions to be linked; e.g., a conditional operation may be predicated on the success or failure of a preceding operation. In addition, the resource script may be specified in a platform-agnostic manner, such that a choice may be made at execution time of an execution context in which the resource script may be executed. If a local execution context is selected, a local script processor may run on the client and issue protocol operations to the server; but if a host execution context is selected, the resource script may be delivered to a script processor located on the host for remote execution. While the performance of the resource script (and applications utilizing the resource script) may differ based on the execution context, the same logical sequence of operations is performed regardless of the location of the script processor.

In this manner, the expression of the operations set as a resource script utilizes the protocol-processing infrastructure of the host, while extending the range of tasks that may be expressed and executed against the data set through the inclusion of flow-control instructions. Moreover, the technique reduces the network transport cost inefficiencies and delays illustrated in the first scenario 10 of FIG. 1; avoids the arbitrary execution of operations and the undesirably complex code illustrated in the second scenario 30 of FIG. 2; reduces the statelessness and isolation of batching illustrated in the third scenario 40 of FIG. 3; and reduces the host-specific complexity, security issues, and limited robustness of selectable execution contexts arising from the mobile agent techniques illustrated in the fourth scenario 50 of FIG. 4.

Figure 5:
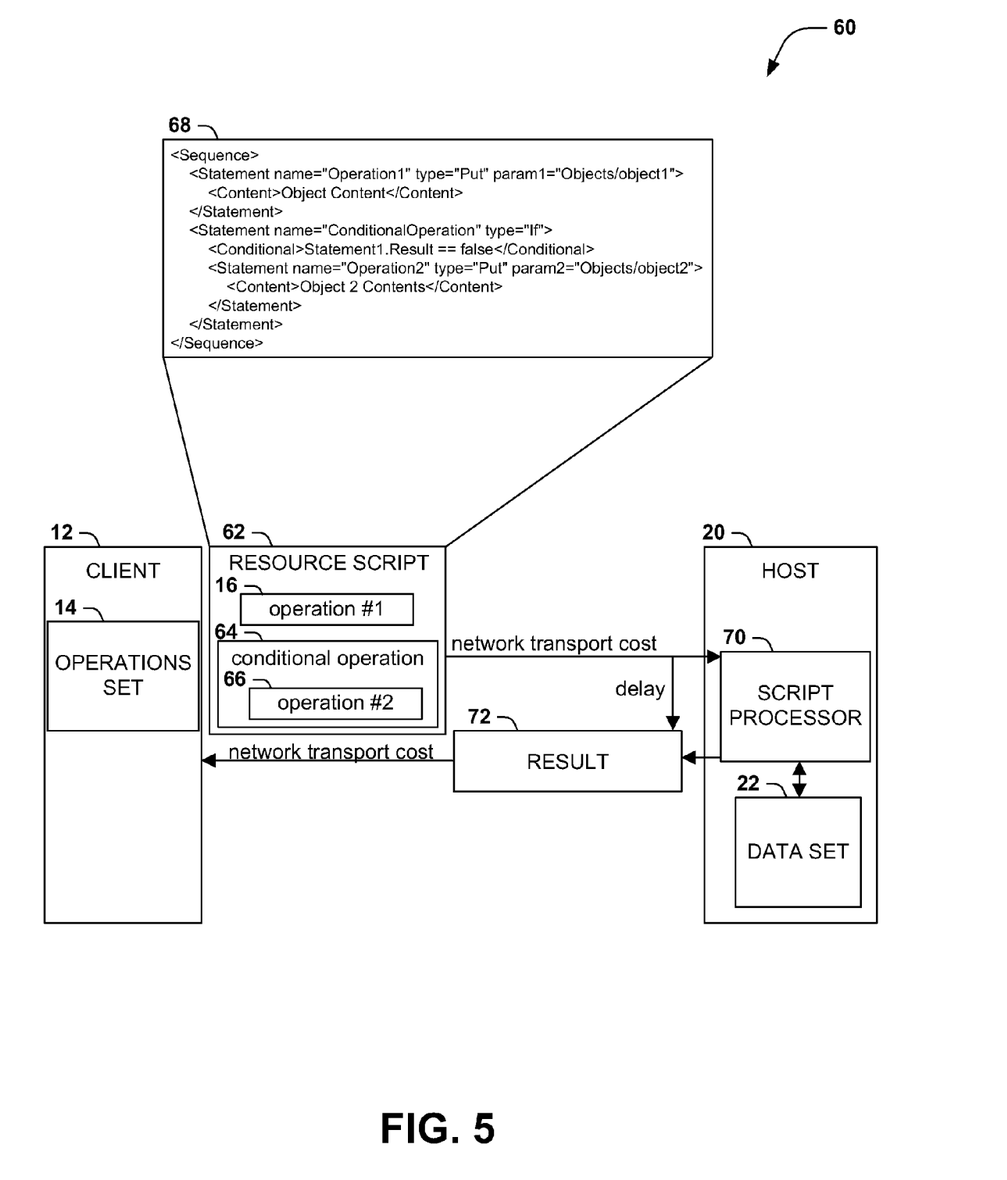
FIG. 5 illustrates an exemplary scenario featuring a technique for executing an operations set against a data set involving a resource script in a protocol-based scripting language.

FIG. 5 illustrates an exemplary scenario 60 featuring an exemplary use of these scripting techniques to achieve the execution of an operations set 14 on a data set 22 accessible through a host 20 according to a protocol (in this scenario, HTTP.) The exemplary scenario 60 involves expressing the operations set 14 as a resource script 62 specified in the script language as a configuration of data set operations (specifying data set instructions) and flow control operations (specifying flow control instructions.) For example, the resource script 62 may specify a data set operation 16, followed by a flow control operation 64 indicating that a subsequent operation (in this scenario, a second data set operation 66) is conditional on the evaluation of a predicate. An exemplary pseudocode block 68 indicates one such resource script 62 specified in a declarative manner (e.g., as an XML document), wherein the second data set operation 66 ("Operation2") is conditioned on the successful performing of the first data set operation ("Operation1"). The resource script 62 may then be delivered to a script processor 70 for evaluation and execution against the data set 22. In this exemplary scenario 60, the script processor 70 is located on the host 20, so the resource script 62 is transmitted to the host 20 over a network. The host 20 applies the resource script 62 to the data set 22 and generates a result 72, which is delivered to the client 12. However, variations may be available; e.g., the resource script 68 may be imperatively specified, and/or the script processor 70 may be located on the client 12 and configured to issue HTTP verbs to the host 20. However, in all such variations, expressing the operations set 14 as a resource script 62 and executing it through a script processor 70 yields improved performance, reduced inefficiency, and/or expanded range of expressiveness with respect to other techniques.

Figure 6:
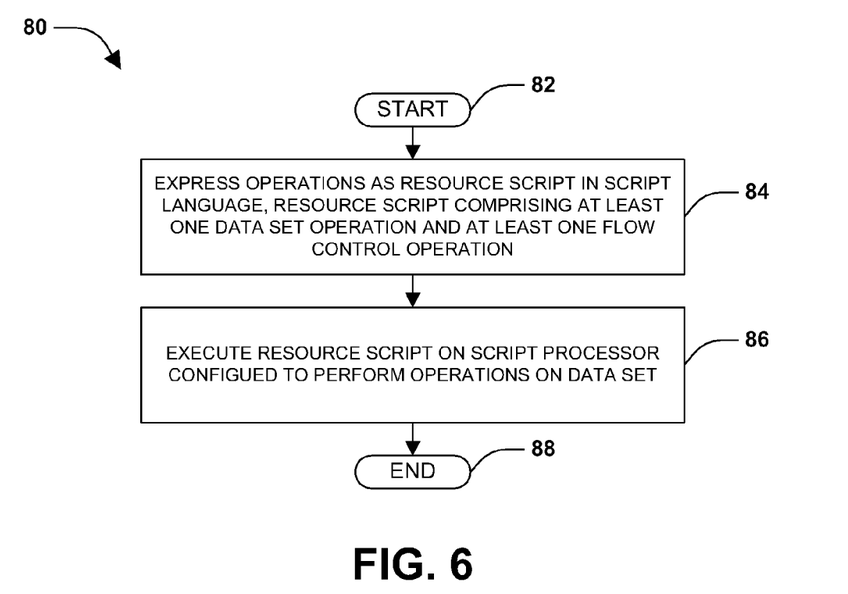
FIG. 6 is a flow chart illustrating an exemplary method of issuing at least two operations on a data set accessible through a host according to a protocol
Figure 7:
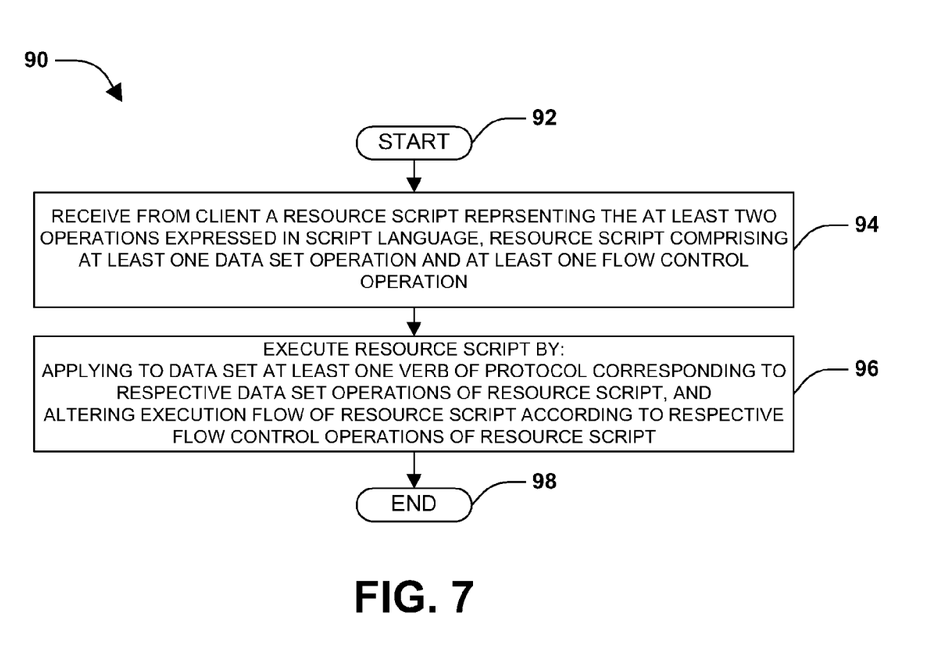
FIG. 7 is a flow chart illustrating an exemplary method of executing at least two operations on a data set on behalf of a client.

FIGS. 6 and 7 illustrate two exemplary embodiments of some of the techniques illustrated in the exemplary scenario 60 of FIG. 5. (These exemplary embodiments may be better understood with reference to FIG. 5, although some of the details of FIG. 5 may be oriented toward the exemplary scenario 60 illustrated therein and may be omitted or differently expressed in various embodiments of these techniques.)

FIG. 6 illustrates a first embodiment comprising an exemplary method 80 of issuing at least two operations on a data set accessible through a host according to a protocol. The exemplary method 80 begins at 82 and involves expressing 84 the operations as a resource script in a script language that includes at least one data set instruction corresponding to at least one verb of the protocol at least one flow control instruction configured to alter an execution flow of the resource script. The resulting resource script therefore comprises at least one data set operation (specifying at least one data set instruction) and at least one flow control operation (specifying at least one flow control instruction.) The exemplary method 80 also involves executing 86 the resource script on a script processor configured to perform operations on the data set. Having achieved the executing of the operations set against the data set through its expression as a resource script with both data set operations and flow control operations, the exemplary method 80 thereby implements the scripting techniques discussed herein, and so ends at 88.

FIG. 7 illustrates a second embodiment comprising an exemplary method 90 of executing at least two operations on a data set on behalf of a client. This exemplary method 90 may be performed, e.g., on the host 20 of a data set 22 that is configured to receive resource scripts 62 formatted according to the script language. The exemplary method 90 begins at 92 and involves receiving 94 from the client a resource script representing the at least two operations expressed in a script language, comprising at least one data set instruction corresponding to at least one verb of a protocol and at least one flow control instruction configured to alter an execution flow of the resource script, wherein the resource script includes at least one data set operation (specifying at least one data set instruction) and at least one flow control operation (specifying at least one flow control operation.) The exemplary method 90 also involves executing 96 the resource script, which involves applying the at least one verb of the protocol corresponding to respective data set operations of the resource script to the data set, and altering the execution flow of the resource script according to respective flow control operations of the resource script. Having received the resource script 62 and executed it against the data set 22 in this manner, the exemplary method 90 thereby enables the processing of the operations set 14 in a comparatively efficient and robust manner, and so ends at 98.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 80 of FIG. 6 and the exemplary method 90 of FIG. 7) to confer individual and/or synergistic advantages upon such embodiments.

A first aspect that may vary among embodiments of these techniques relates to the scenario in which the techniques may be utilized. As a first example, the data set may comprise many types of data, such as a filesystem managed by a file server, a database managed by a database manager, or an object store managed by an object host. The client may also represent many types of clients, such as an authorized user of the services of the host, a guest, or another server interoperating with the host (e.g., the host may comprise a backup file server with which a main file server synchronizes through the delivery of a resource script.)

One scenario in which these techniques may be particular applicable involves a deployable computing environment. This scenario may be devised to address the increasingly large and diverse set of objects managed by a set of object systems. For example, a computing environment may comprise a set of files managed by a file system, one or more databases managed by a database system, a set of executable binaries representing applications and managed by an assembly cache, a set of user profiles managed by a user profile component of an operating system, and various data caches managed by data caching components, such as a set of copied items managed by a copy buffer of the operating system, a set of undo actions managed by an undo component of the operating system, and a set of "most recently used" items managed by an item usage tracking component of the operating system. Moreover, such objects may be exchanged among a plurality of devices operated by one or more users, and according to one or more operations (e.g., an object synchronization operation that merges two object sets and an object mirroring operation that adjusts a target object set to match a source object set.) In this manner, the objects are loosely organized through a set of object systems and aggregated to represent the computing environment.

In order to reduce the complex variety and decentralization of the objects comprising a contemporary computing environment, a deployable representation of the computing environment may be devised, where the objects comprising the computing environment are organized in an object hierarchy, which may be hosted by a computing environment host. If the objects are represented in a uniform manner and managed in a consistent way by an object system, a set of services may be devised to apply to all of the objects of the computing environment. Moreover, the object hierarchy may be delivered to various devices to represent the same computing environment (including the same user profiles, applications, data files, etc.), and each device may render the computing environment in a consistent manner but customized based on the capabilities of the device (e.g., a hard keyboard interface for receiving data entry from a keyboard device attached to a workstation, and a touchscreen software keyboard interface for receiving data entry from a cellphone device.) With relation to the concept of a deployable computing environment, it may be advantageous to configure at least one server to manage one or more data objects within the representation, and to accept operations sets to be applied to such data objects. A user of the deployable computing environment may therefore interact with the deployable computing environment in a platform- and device-independent manner, while also achieving at least some of the advantages over alternative accessing techniques, such as synchronous or asynchronous invoking, batching of standard operations, and mobile agents. However, those of ordinary skill in the art may devise many such scenarios in which the techniques discussed herein may be applied.

Figure 8:
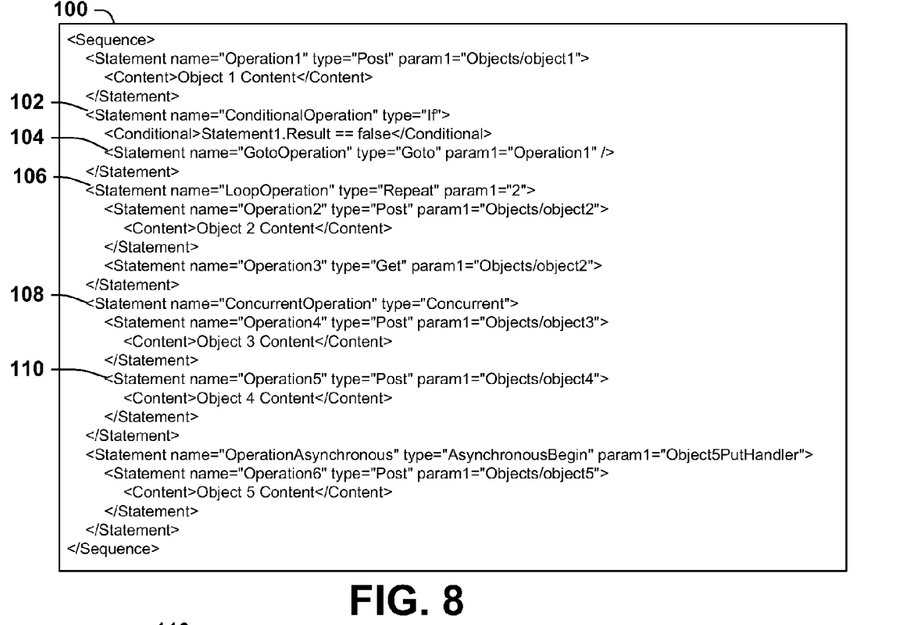
FIG. 8 is a pseudocode block illustrating an exemplary declaratively-specified resource script comprising various flow control operations.

A second aspect that may vary among embodiments of these techniques relates to the nature of the script language used to specify the operations set as a resource script. Many types of script languages may be used to specify an operations set according to at least one data set operation and at least one flow control operation according to a protocol. As a first example, the script language may be specified declaratively, i.e., as a series of elements that together describe the operations of the operation set. Declarative script languages may be advantageous for permitting a specifying of the script as a document (e.g., as an XML document), which may be more easily human-readable than a partially or wholly compiled set of machine-language instructions, and which may be more easily scanned by an automated parser for errors or vulnerabilities. FIG. 8 illustrates an exemplary resource script 100 specified in a declarative manner, comprising a set of operations (such as "Operation1" and "ConditionalOperation") that invoke instructions of the script language (such as the "Put" data set instruction and the "If" flow control operation) arranged in a nesting hierarchy that is human-readable and parseable in an automated manner due to the regular structure of the resource script 100. However, the script language may (alternatively or additionally) utilize other programming paradigms, such as imperative procedural, object-oriented, and aspect-oriented programming. As a second example, the script language in which the operations sets are specified may be devised to model many protocols. As one example, where the host comprises an HTTP endpoint (such as a webserver), resource scripts specified in a script language that models the data set instructions on HTTP verbs (such as HTTP POST, HTTP GET, HTTP PUT, and HTTP DELETE) may advantageously promote easier interfacing and wider compatibility with many types of hosts. However, other protocols may be utilized; e.g., where the host comprises an FTP server, the script language may include data set instructions modeled after FTP verbs, such as GET and PUT; and where the host comprises a POP email server, the script language may include data set instructions modeled after POP verbs, such as LIST, RETR, and DELE.

Figure 9:
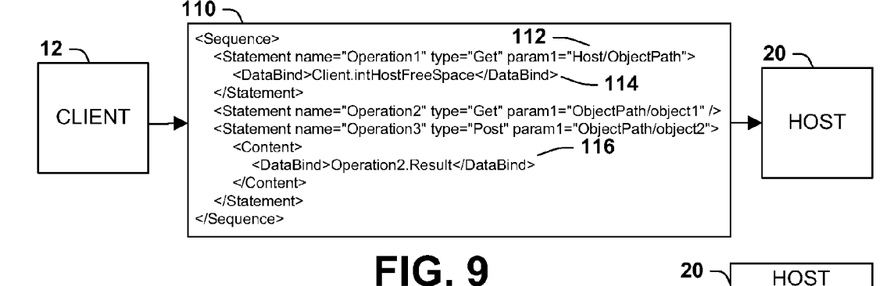
FIG. 9 is an illustration of a resource script featuring various forms of data-binding of operations with a client and a host.

As a third example of this second aspect, the flow control instructions included in the script language may embody flow-control constructs derived from many languages. FIG. 9 presents some of the flow-control instructions that might be included in such a script language an exemplary resource script 100. As a first example, the script language may include a conditional instruction that specifies conditional executing of at least one operation. The exemplary resource script 100 includes a conditional operation 102 specifying an exemplary use of a conditional instruction (an "If" instruction), such that a block of operations is executed only if a preceding instruction fails. As a second example, the script language may include a relocating instruction that specifies a relocating of flow control to a target operation. The exemplary resource script 100 includes a relocating operation 104 specifying an exemplary use of a relocating instruction (a "Goto" instruction), such that flow control is transferred to Operation1. As a third example, the script language may include an iterative instruction that specifies repetitive executing of at least one operation. The exemplary resource script 100 includes an iterative operation 106 specifying an exemplary use of an iterative instruction (a "Loop" instruction), such that a block of operations (Operation2 and Operation3) are executed twice.

As a fourth example of flow control instructions that may be included in script languages, the script language may include a concurrent executing instruction that specifies concurrent executing of at least two operations. The exemplary resource script 100 of FIG. 8 includes a concurrent executing operation 108 specifying an exemplary use of a concurrent executing instruction (a "Concurrent" instruction), such that two operations ("Operation4" and "Operation5") are issued and executed concurrently, and such that execution of the resource script 100 may be blocked until both operations complete. As a fifth example, the script language may include an asynchronous executing instruction that specifies asynchronous executing of at least one operation. The exemplary resource script 100 includes an asynchronous executing operation 110 specifying an exemplary use of an asynchronous executing instruction ("AsynchronousBegin"), such that the execution of a contained operation ("Operation6") is initiated (e.g., on a separate thread, through a request issued to another process or device, etc.), but flow control through the resource script 100 continues concurrently with the asynchronous operation, and another operation (e.g., "Object5PutHandler") is automatically invoked when the asynchronously executed operations complete. These examples are but some of the flow control instructions that may be included in a script language, and those of ordinary skill in the art may devise script languages featuring many types of flow control instructions that may be utilized in resource scripts such as disclosed herein.

A particular use of flow control instructions in resource scripts comprises a compensation mechanism, which may be achievable through the use of resource scripts in a manner that is more difficult to achieve in other techniques for specifying resource scripts. It may be appreciated that operations on data sets occasionally fail, and that failure handling techniques are available in many computing scenarios (such as transactional operations in database programming that respond to a failed instruction by rolling back the effects of previous operations and reporting a failure, or exception handling in imperative programming, whereby a set of instructions in a catch{ } block may be invoked if any instruction in a try{ } block fails.) However, many protocols (such as HTTP) do not include sophisticated techniques for handling errors, and a host may be unable to provide a transaction-like mechanism for responding to failures in a prompt manner as part of the protocol. For example, a synchronous configuration, such as in the first scenario 10 of FIG. 1, may permit the host 20 to notify a client 12 of a failure of an operation 16 in an operation result 18, and the client 12 may issue a follow-up operation 16 to handle the error (such as by reversing the effects of preceding operations.) However, the follow-up operations 16 issued by the client 12 may be delayed, e.g., by the network transport costs, and the delay in executing the follow-up operations 16 after the failure of a preceding operation may be prohibitively lengthy, and may leave the data set 22 in an inconsistent state for an unacceptably lengthy period. By contrast, resource scripts 14 expressed as discussed herein may include compensating operations that promptly handle failures of previous operations. For example, in the exemplary resource script 100 of FIG. 8, the result of a write operation ("Operation1") may be promptly tested by a conditional operation 102, and if a failure arises, a set of compensating operations may be promptly performed (e.g., the "Goto" relocating operation 104 may alter the flow of execution to retry the failed write.) In this manner, flow control instructions of a script language may be used to confer compensation capabilities on a resource script that may not be acceptably available in other techniques.

As a third example of this third aspect, the script language may permit various forms of data binding, where an aspect of the resource script is unidirectionally or bidirectionally linked with a data source, such that a change of data at one end of the data binding may be automatically propagated to the other end of the data binding. FIG. 9 illustrates three examples of data binding in an exemplary resource script 110. As a first example, an operation in the resource script 110 may be configured to data bind with at least one aspect of the host 20, and the script processor 70 while executing the resource script 110 may data bind the operation with the specified aspect of the host. For example, a data host binding operation 112 may specify a value provided by the host 20, such as the path of objects in the data set. The value may then be propagated through to other parts of the resource script 110; e.g., other instructions may be configured to use the value reported by the host. As a second example, an operation in the resource script 110 may be configured to data bind with at least one aspect of the client 12. For example, the resource script 110 may be executed on behalf of an application, and a data binding operation 114 may associate an aspect of the application (such as a value in a control) with a value in the resource script 110. In furtherance of this application, the result of Operation1 (i.e., the object path of objects on the host 20) may be automatically synchronized with an aspect of the application (such as a string displayed within a textbox or label.) As a third example, operations of the resource script 110 may be configured to data bind with various aspects of the resource script 110, such as the output of other operations. For example, a data binding operation 116 may configure one operation to use as input the output of a preceding instruction. In the exemplary resource script 110 of FIG. 9, this type of data binding is useful for copying an object, where a first operation ("Operation2") gets an object from the host and provides it as output that is used as input by a second operation ("Operation3") that stores the same object on the host 20 by a different name. This data binding among instructions of the operations set 110 may permit the chaining of operations that reduces unnecessary trips back to the client 12 (e.g., the client 12 does not actually need information about the contents of object1, but rather simply wishes the host 20 to copy it to an object with a different name.) Those of ordinary skill in the art may devise many data-binding techniques that may be enabled in script languages used in the generation of operations sets such as discussed herein.

Figure 10:
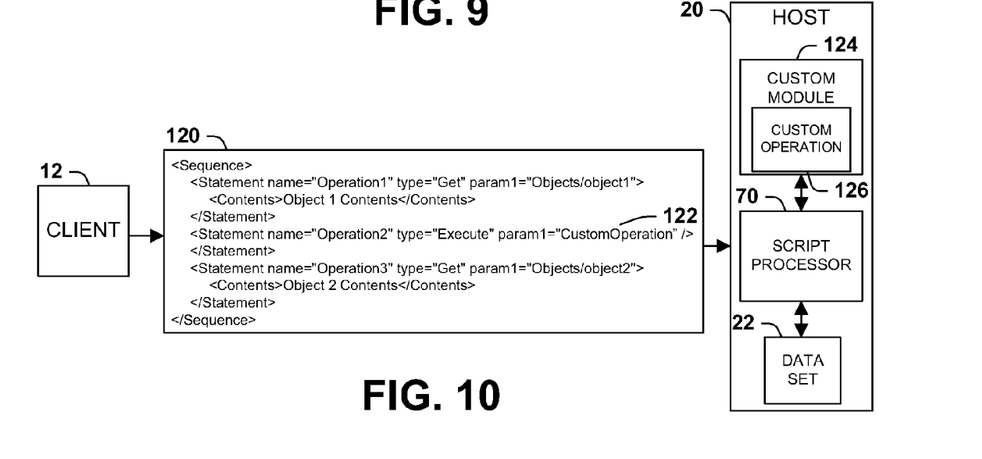
FIG. 10 is an illustration of a resource script referencing a custom operation in a custom module.

As a fourth example of this third aspect, the script instruction may support the referencing within an resource script of a custom operation, which may be specified in a custom module, such as a library. The custom module may be provided to a script processor to permit the invocation of the custom operations contained therein; e.g., a host may receive and store the custom module (such as in an assembly cache.) The script processor may later encounter a flow control operation in a resource script that specifies the custom operation, and may alter the flow of the resource script to execute the custom operation. FIG. 10 illustrates a host 20 comprising a script processor 70 that has been operatively coupled with a custom module 124 that contains a custom operation 126. The script processor 70 may be presented with a resource script 120 that includes a flow control instruction 122 referencing the custom operation 126. Upon identifying this flow control instruction 122 in the resource script 120, the script processor 70 may alter the flow of execution of the operations set 120 to invoke the custom operation 126 in the custom module 124, and may return flow of execution to a subsequent instruction (e.g., Operation3) within the resource script 120. This capability of the script language confers a "pluggable" aspect to the host, whereby domain-specific operations may be exposed and performed within the context of the script language.

A fourth aspect that may vary among embodiments of these techniques relates to the manner of expressing the resource script. A user may author a resource script using a variety of text-editing tools, such as a text editor and a document schema validator. An automated tool may also generate a resource script to perform a particular task, such as may be specified by a user through a higher-level interface, such as a tool. A third example involves a development environment that that is configured to express resource scripts according to the script language. For example, the development environment may present to the user the available instructions of the script language, and the user may interact with the development environment to select and configure particular instructions. Upon receiving from the user at least two interactions specifying at least two instructions, the development environment may then express the resource script comprising the at least two operations associated with the instructions. Those of ordinary skill in the art may devise many development environments and many other ways of generating the resource scripts utilized in the techniques discussed herein.

A fifth aspect that may vary among embodiments of these techniques relates to a selectable execution context of the resource script. One advantage of devising a script language formatted according to a protocol that is executable on a host is that the resource script may be executed on the data set either by sending it to the host, or by executing the resource script locally on the client and simply issuing operations to the host.

If the client (or device) is selected as the execution context, a local script processor may be invoked to execute the resource script. Upon encountering a flow control operation, the local script processor may alter the flow of execution through the resource script (e.g., by changing an instruction pointer.) Upon encountering a data set operation, the script processor may select a verb of the protocol corresponding to the data set operation, and may issue the verb to the host to achieve the data set operation.

Conversely, if the host is selected as the execution context, the executing may involve sending the resource script to the host for execution through a script processor located on the host. In particular, sending the resource script to the host may involve may involve serializing the resource script according to a wire protocol that is supported by the host to express a serialized resource script, and then sending the serialized resource script to the host. For example, the host may support one or several of a set of wire protocols (e.g., JSON, Atom, and RSS); when a host is selected for an execution context, the client may query the host for supported wire protocols, and may then deliver the resource script to the host in a serialized format according to one of the supported wire protocols. In addition, the host may interoperate with the client to present the results of the operations set to the client. For example, if the executing of the resource script results in at least one resource script result, the host may send the at least one resource script result to the client. The client may then act on the resource script results, such as by storing the results, by data-binding the results to an aspect of the client (such as an application), or by displaying the resource script response on the device (e.g., within an application.)

The runtime-selectable execution context enabled by resource scripts devised in this manner may provide several advantages. As a first example, by specifying the operations set in such an instruction set, the selection of an execution context for a particular resource script may be deferred until runtime or on a just-in-time basis. These execution contexts may have different advantages (e.g., executing on the host may reduce the network transport costs of respective operations, and therefore may be faster if the resource script contains many data set operations; however, executing on the client may be helpful for debugging, because the client may monitor the state of the resource script during execution), and it may be advantageous to defer the selection of the execution context until runtime. Additionally, a resource script may be executed in a selected execution context without having to reconfigure the resource script for the selected execution context, and with equivalent results on the data set. Moreover, the effect on the data set is equivalent regardless of the selected execution context; either the host executes the resource script and locally applies appropriate data set operations to the data set, or the client executes the resource script and simply issues appropriate data set operations (based on the protocol) to the host. Thus, expressing the resource script according to the instruction set specified with respect to the protocol enables the generation of an execution-context-independent resource script, while the selection of execution context may be deferred until runtime and then applied without resource script reconfiguration to achieve an equivalent effect on the data set. However, those of ordinary skill in the art may devise many uses and implementations of a runtime-selectable execution context for resource scripts utilized according to the techniques discussed herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 11:
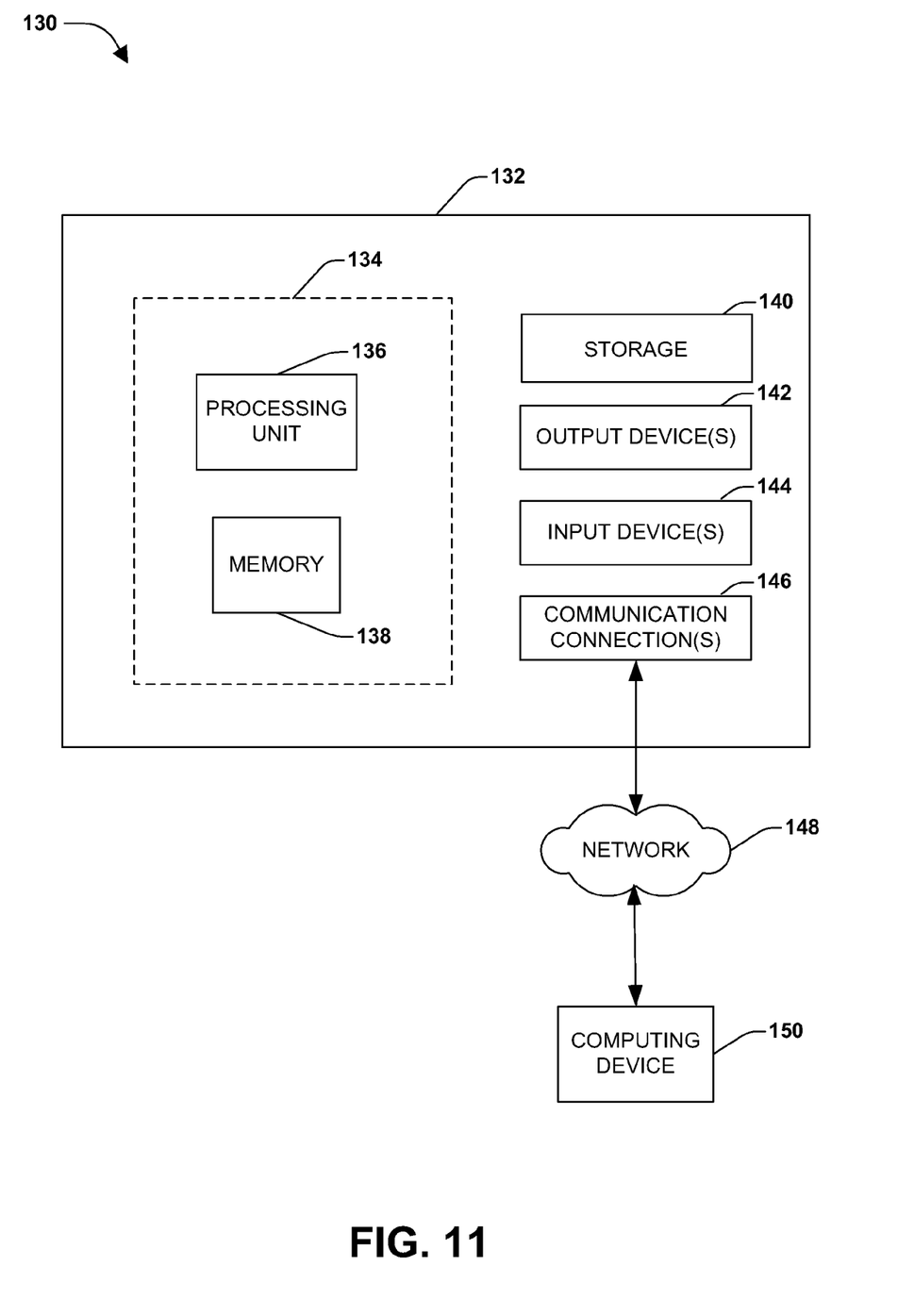
FIG. 11 illustrates an exemplary computing environment wherein one or more of the provisions set forth herein may be implemented.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 130 comprising a computing device 132 configured to implement one or more embodiments provided herein. In one configuration, computing device 132 includes at least one processing unit 136 and memory 138. Depending on the exact configuration and type of computing device, memory 138 may be volatile (such as RAM, for example), non-volatile (such as ROM, flash memory, etc., for example) or some combination of the two. This configuration is illustrated in FIG. 11 by dashed line 134.

In other embodiments, device 132 may include additional features and/or functionality. For example, device 132 may also include additional storage (e.g., removable and/or non-removable) including, but not limited to, magnetic storage, optical storage, and the like. Such additional storage is illustrated in FIG. 11 by storage 140. In one embodiment, computer readable instructions to implement one or more embodiments provided herein may be in storage 140. Storage 140 may also store other computer readable instructions to implement an operating system, an application program, and the like. Computer readable instructions may be loaded in memory 138 for execution by processing unit 136, for example.

The term "computer readable media" as used herein includes computer storage media. Computer storage media includes volatile and nonvolatile, removable and non-removable media implemented in any method or technology for storage of information such as computer readable instructions or other data. Memory 138 and storage 140 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 132. Any such computer storage media may be part of device 132.

Device 132 may also include communication connection(s) 146 that allows device 132 to communicate with other devices. Communication connection(s) 146 may include, but is not limited to, a modem, a Network Interface Card (NIC), an integrated network interface, a radio frequency transmitter/receiver, an infrared port, a USB connection, or other interfaces for connecting computing device 132 to other computing devices. Communication connection(s) 146 may include a wired connection or a wireless connection. Communication connection(s) 146 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 132 may include input device(s) 144 such as keyboard, mouse, pen, voice input device, touch input device, infrared cameras, video input devices, and/or any other input device. Output device(s) 142 such as one or more displays, speakers, printers, and/or any other output device may also be included in device 132. Input device(s) 144 and output device(s) 142 may be connected to device 132 via a wired connection, wireless connection, or any combination thereof. In one embodiment, an input device or an output device from another computing device may be used as input device(s) 144 or output device(s) 142 for computing device 132.

Components of computing device 132 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 132 may be interconnected by a network. For example, memory 138 may be comprised of multiple physical memory units located in different physical locations interconnected by a network.

Those skilled in the art will realize that storage devices utilized to store computer readable instructions may be distributed across a network. For example, a computing device 150 accessible via network 148 may store computer readable instructions to implement one or more embodiments provided herein. Computing device 132 may access computing device 150 and download a part or all of the computer readable instructions for execution. Alternatively, computing device 132 may download pieces of the computer readable instructions, as needed, or some instructions may be executed at computing device 132 and some at computing device 150.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

It may be appreciated that a resource script may comprise a resource script.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of issuing at least two operations on a data set accessible through a host according to a protocol, comprising:
    expressing the operations as a declarative resource script in a declarative script language comprising:
        at least one declarative data set instruction applying a verb of the protocol to the data set, and
        at least one declarative flow control instruction configured to alter an execution flow of the declarative resource script according to a flow control operation selected from a flow control operation set comprising:
    conditional executing of at least one operation;
    relocating to a target operation of the declarative resource script;
    iterative executing of at least one operation;
    concurrent executing of at least two operations; and
    asynchronous executing of at least one operation,
    wherein the declarative resource script comprises at least one declarative flow control instruction and at least two declarative data set instructions that, unless logically ordered by a declarative flow control instruction, may be executed in any logical order; and
        interpreting the declarative resource script through a declarative script processor configured to perform operations on the data set by issuing the verbs of the protocol specified by the declarative data set instructions to the host.

2. The method of claim 1, the data set comprising at least one resource represented in a deployable computing environment hosted by the host.

3. The method of claim 1:
    the protocol comprising Hypertext Transport Protocol (HTTP);
    the verbs of the protocol comprising HTTP POST, HTTP GET, HTTP PUT, and HTTP DELETE; and
    the host comprising an HTTP endpoint.

4. The method of claim 1, at least one declarative flow control instruction specifying a conditional executing of at least one compensating flow control operation upon detecting a failure of at least one preceding operation.

5. The method of claim 1, at least one operation configured to data bind with at least one aspect of the declarative resource script.

6. The method of claim 1, at least one declarative flow control instruction specifying a custom operation performable on the data set that is specified in a custom module.

7. The method of claim 1, the expressing comprising:
    displaying for a user a development environment configured to express declarative resource scripts according to the declarative script language; and
    upon receiving from the user at least two interactions specifying at least two operations, expressing the declarative resource script comprising the at least two declarative instructions.

8. The method of claim 1, the interpreting comprising:
    upon receiving a request to execute the declarative resource script, selecting an execution context;
    upon selecting an execution context on a device, interpreting the declarative resource script through a declarative script processor on the device; and
    upon selecting an execution context on the host, sending the declarative resource script to a declarative script processor on the host.

9. The method of claim 8, interpreting the declarative resource script on a declarative script processor on the device comprising:
    for respective data set operations, issuing to the host the verb of the protocol and specifying the data set, and
    for respective flow control operations, alter an execution flow of the declarative resource script.

10. The method of claim 8, interpreting the declarative resource script on a declarative script processor on the host comprising:
  serializing the declarative resource script according to a wire protocol supported by the host to express a serialized declarative resource script, and
  sending the serialized declarative resource script to the host.

11. The method of claim 8:
  the host selected for the execution context of the declarative resource script, and
  the method comprising: upon receiving from the host at least one declarative resource script response resulting from interpreting the declarative resource script, displaying the declarative resource script response on the device.

12. The method of claim 11, comprising: upon receiving from the host at least one declarative resource script response resulting from interpreting the declarative resource script, data binding at least one aspect of the device with the declarative resource script response.

13. A method of executing at least two operations on a data set on behalf of a client, comprising:
  receiving from the client a declarative resource script representing the at least two operations expressed in a declarative script language comprising:
    at least one declarative data set instruction applying a verb of a protocol to the data set, and
    at least one declarative flow control instruction configured to alter an execution flow of the declarative resource script according to a flow control operation selected from a flow control operation set comprising:
      conditional executing of at least one operation;
      relocating to a target operation of the declarative resource script;
      iterative executing of at least one operation;
      concurrent executing of at least two operations; and
      asynchronous executing of at least one operation,
  the declarative resource script comprising at least two declarative data set instructions and at least one declarative flow control instruction; and
  interpreting the declarative resource script by:
    for respective declarative data set instructions that are not logically ordered by a declarative flow control instruction, selecting a logical ordering of the declarative data set instructions;
    for respective declarative data set instructions, issuing to the host, according to the logical ordering, the verb of the protocol specified by the declarative data set instruction of the declarative resource script and specifying the data set; and
    altering the execution flow of the declarative resource script according to respective declarative flow control operations of the declarative resource script.

14. The method of claim 13, the data set comprising at least one resource represented in a deployable computing environment hosted by the host.

15. The method of claim 13:
  the method comprising: receiving a custom module comprising at least one custom operation performable on the data set; and
  the interpreting comprising: upon identifying a flow control instruction in the declarative resource script specifying a custom operation included in the custom module, executing the custom operation on the data set.

16. The method of claim 13:
  at least one operation configured to data bind with at least one aspect of the host, and
  the interpreting comprising: data binding the operation with the at least one aspect of the host.

17. The method of claim 13:
  the interpreting resulting in at least one declarative resource script result, and
  the method comprising: sending the at least one declarative resource script result to the client.

18. A method of issuing at least two operations on a data set at least one resource represented in a deployable computing environment accessible through a host supporting a protocol comprising Hypertext Transport Protocol (HTTP) and comprising an HTTP endpoint, the method comprising:
  displaying for a user a development environment configured to express declarative resource scripts according to a declarative script language; and
  upon receiving from the user at least two interactions specifying at least two operations, expressing the operations as a declarative resource script in a declarative script language comprising:
    at least one declarative data set instruction applying a verb of the protocol comprising HTTP POST, HTTP GET, HTTP PUT, and HTTP DELETE to the data set; and
    at least one declarative flow control instruction configured to alter an execution flow of the declarative resource script comprising at least one of:
      conditional executing of at least one operation,
      relocating to a target operation of the declarative resource script,
      iterative executing of at least one operation,
      concurrent executing of at least two operations, and
      asynchronous executing of at least one operation,
  the declarative resource script comprising at least one declarative data set instruction and at least one declarative flow control instruction; and
  upon receiving a request to interpret the declarative resource script:
    selecting an execution context;
    for respective declarative data set instructions that are not logically ordered by a declarative flow control instruction, selecting a logical ordering of the declarative data set instructions;
    interpreting the declarative resource script through a declarative script processor on the device configured to perform operations on the data set and according to the logical ordering by, for respective declarative data set operations, issuing the corresponding verb of the protocol to the host and specifying the data set; and
    upon selecting an execution context on the host:
      serializing the declarative resource script according to a wire protocol supported by the host to express a serialized declarative resource script;
      sending the serialized declarative resource script to a declarative script processor on the host configured to perform operations on the data set by issuing the verbs of the protocol specified by the declarative data set instructions to the host; and
      upon receiving from the host at least one declarative resource script response resulting from executing the declarative resource script, data binding at least one aspect of the device with the declarative resource script result.

19. The method of claim 13, the interpreting comprising:
- upon receiving a request to execute the declarative resource script, selecting an execution context;
- upon selecting an execution context on a device, interpreting the declarative resource script through a declarative script processor on the device; and
- upon selecting an execution context on the host, sending the declarative resource script to a declarative script processor on the host.

20. The method of claim 19, interpreting the declarative resource script on a declarative script processor on the device comprising:
- for respective data set operations, issuing to the host the verb of the protocol and specifying the data set, and
- for respective flow control operations, alter an execution flow of the declarative resource script.

\* \* \* \* \*